United States Patent [19]
Ashley

[11] Patent Number: 5,402,116
[45] Date of Patent: Mar. 28, 1995

[54] ATMOSPHERIC PRESSURE CALIBRATION SYSTEMS AND METHODS

[75] Inventor: Allan Ashley, Roslyn Heights, N.Y.

[73] Assignee: Hazeltine Corp., Greenlawn, N.Y.

[21] Appl. No.: 874,903

[22] Filed: Apr. 28, 1992

[51] Int. Cl.[6] .................. G08C 17/00; G01S 13/00
[52] U.S. Cl. ................... 340/870.1; 340/825.54;
340/977; 340/601; 342/26; 342/50; 342/38; 73/384
[58] Field of Search ............... 340/870.10, 825.54, 340/961, 974, 977, 601; 342/26, 36, 50, 51, 38, 118, 145; 11/11; 73/384

[56] References Cited

U.S. PATENT DOCUMENTS

| | | | |
|---|---|---|---|
| 4,050,069 | 9/1977 | Schlussler | 342/38 |
| 4,295,139 | 10/1981 | Arpino | 340/870.1 |
| 4,454,510 | 6/1984 | Crow | 342/38 |
| 4,463,357 | 7/1984 | MacDoran | 342/26 |

*Primary Examiner*—Donnie L. Crosland
*Attorney, Agent, or Firm*—E. A. Onders; K. P. Robinson

[57] ABSTRACT

Systems are provided to derive a value of barometric pressure at a defined location in the atmosphere at a computed geometric height. By using the geometric height in a look-up table of pressure/height values representing a standard atmospheric profile, atmospheric deviation data indicative of the difference between measured and reference pressures at that atmospheric location (C) is derived. Ground-based interrogators (10,20) located at spaced positions are used to initiate response signals from airborne transponders commonly installed in transient aircraft (C). Using resulting range data based on round-trip timing differences in signals sent to (12,16) and received from (16,14) the airborne transponder (C), geometric analysis and computation is used (18) to determine the geometric height of the transponder representing a specific atmospheric location. The height, together with barometric pressure data transmitted by the airborne transponder, are used (28) for the look-up of reference pressure data and derivation of atmospheric deviation data for that atmospheric location. Systems and methods provide such data for inflight altimeter calibration, height determination, atmospheric pressure profile development, weather forecasting, transponder calibration and other purposes.

34 Claims, 6 Drawing Sheets

ATMOSPHERIC PRESSURE CALIBRATION SYSTEMS AND METHODS

This invention relates to determination of atmospheric pressure deviation at points in the atmosphere by interrogation of equipment commonly present in transient aircraft. Such atmospheric deviation data is useful for calibrating the atmosphere against a standard atmosphere, determining aircraft height from indicated barometric altitude, calibrating barometric altimeters, weather forecasting and other purposes.

BACKGROUND OF THE INVENTION

Systems exist for measuring the height or altitude of an aircraft. An airborne radar altimeter can be used to measure geometric height (i.e., distance between the aircraft and ground). An airborne barometric altimeter can be used to provide a measure of barometric altitude (i.e., an estimate of altitude above mean sea level based on comparing measured barometric pressure to a standard atmosphere value).

However, even if such measurements are accurately performed, the radar altimeter provides readings during level flight which will vary widely depending on whether the aircraft is passing over a valley or a mountain. While a ground-based precision radar might be used to accurately determine height of a passing aircraft above a defined datum level (based on radar measurements adjusted for the elevation of the radar site), such radars are expensive and not available in many geographical areas. Similarly, even if a barometric altimeter accurately measures barometric pressure and converts the pressure reading to a corresponding altitude, such conversion merely provides an altitude value from a pressure/altitude chart or table representing standard atmosphere data, such as provided by the International Civil Aviation Organization ("ICAO"). FIG. 1 is an example of such a chart, in which P is a scale of pressure in millibars, A is a scale of altitude in thousands of feet and S is a standard ICAO pressure/altitude profile for a temperature lapse rate of two degrees centigrade per one thousand feet and a temperature of 15 degrees centigrade at mean sea level (MSL). A problem in using such charts is that an aircraft does not fly in a standard atmosphere, but in the real atmosphere which is subject to temporal and spatial weather differences affecting the barometric pressure measured at any aircraft altitude. As a result, since there will virtually always be a discrepancy between the actual pressure as measured at the aircraft location and the standard pressure for the aircraft elevation, there will virtually always be a discrepancy in a barometric altimeter reading.

Thus, even with all equipment accurately calibrated, a radar altimeter can provide relative height above the earth's surface, but when operating over land it cannot reliably measure height above a reference datum like MSL. Also, a barometric altimeter measures altitude based on sensing of barometric pressure, but pressure varies in an unpredictable manner for a given geometric height and does not provide a repeatable reference relative to a datum like MSL. The preceding discussion does not address calibration difficulties and resulting error. For example, a barometric altimeter on an aircraft must be arranged to attempt to measure static pressure in a moving air stream subject to variations in aircraft speed and altitude, temperature and humidity, and subject to possible changes in aircraft configuration, damaged or blocked sensors, and barometer decalibration over time with no adequate means of recalibration.

A typical practical problem is the requirement for continuous data acquisition to permit evaluation of changing weather conditions for control of civilian air traffic, weather forecasting and a variety of other civilian, commercial and military applications. For weather forecasting, as well as for air traffic control, it will be apparent that there is a continuing need for current data on actual atmospheric conditions at different geometric heights on a local, national and global basis. While many types of relevant data can be gathered, and sophisticated analysis and plotting of data can be provided, one particular need has continued unanswered. That is the need to know, for different geometric heights at different geographic points on a continuing basis, how the measured barometric pressure at a particular height above MSL, for example, differs from a standard barometric pressure for that height above MSL.

That difference between measured barometric pressure and a reference barometric pressure, for that geometric height, location and time, can be termed an "atmospheric deviation". It can be shown that if accurate atmospheric deviation data could be made available it would be valuable for many purposes. Weather forecasters, with knowledge of the atmospheric deviation between currently measured and reference pressure values, can analyze atmospheric conditions and forecast developing conditions. Air traffic controllers can apply derived information regarding changes in vertical separation of flight paths resulting from atmospheric pressure changes. Aircraft flight crews can be supplied with altimeter calibration information and data correlating barometric altitude with geometric height. Atmospheric deviation data may also be applied in current calibration of aircraft landing systems, for monitoring developing conditions which may identify wind shear in the vicinity of airports, and for a variety of other civilian, commercial and military purposes. In FIG. 1, curve C is a representation of the use of atmospheric deviation data to calibrate the atmosphere against a standard atmosphere represented by curve S. Thus, with availability of accurate deviation data, it would become possible to provide profile C based upon differences between standard or reference pressure and pressure values based on current barometric measurements, at different altitudes.

While instrumented weather balloons (radiosondes), as well as highly-equipped dedicated aircraft, have been used to gather atmospheric data, these and other existing devices and systems have been expensive, inaccurate and/or used only at a few geographic locations, so that sufficient quantities of current, accurate data have not been available. Thus, it should be noted, that regardless of what forms of theoretical and other systems have been proposed or implemented, a need has continued to exist for a practical, accurate and economical system able to provide a continuing volume of currently updated atmospheric deviation data for dispersed geographical areas of interest, without necessitating specially equipped or dedicated aircraft, development of new forms of equipment or new types of ground installations.

It is, therefore, an object of this invention to provide new and improved systems and methods for determining atmospheric deviations between current atmospheric pressure and reference atmospheric pressure at a point in the atmosphere, as well as for determining accurate geometric height corresponding to a measured barometric altitude, barometric pressure at a point of known geometric height, accurate geometric height of an aircraft, or barometric altimeter calibration for an aircraft while in flight, as may be desired.

It is a further object to provide such systems and methods for making available improved data usable for atmospheric condition analysis, weather forecasting, air traffic control, airport operations, and other uses.

A particular object is to provide such systems and methods which are operable from ground installations through interaction with airborne transponders commonly available in transient aircraft.

Other objects are to provide such systems and methods which avoid cost, accuracy and data availability constraints of prior systems and methods, and which may be implemented simply and economically utilizing existing types of equipment already in use.

SUMMARY OF THE INVENTION

In accordance with the invention, a system for deriving atmospheric deviation data for a location in the atmosphere, in cooperation with an airborne transponder which provides response signals including current data based upon barometric pressure, includes one or more transmitting means for transmitting first signals to the airborne transponder and a plurality of receiving means, positioned at spaced positions, for receiving response signals transmitted by the airborne transponder from an atmospheric location in response to such first signals. The response signals include current data based upon barometric pressure in the vicinity of the atmospheric location. The system includes signal processing means, coupled to the receiving means and responsive to timing differences between the transmitting of such first signals and receiving of response signals, for utilizing range data derived from such timing differences and geometric data regarding the spaced positions of the receiving means for deriving data representative of geometric height of the atmospheric location. Comparison means are included for utilizing the data representative of geometric height and the current data based upon barometric pressure for deriving atmospheric deviation data representative of deviation between such current data based upon barometric pressure and barometric reference data applicable to the atmospheric location.

Also, in accordance with the invention, a method for deriving atmospheric deviation data for a location in the atmosphere, in cooperation with an airborne transponder providing response signals including current data based upon barometric pressure, comprising the steps of:

(a) transmitting first signals to the airborne transponder;

(b) receiving, at a plurality of spaced positions, response signals transmitted by the airborne transponder from an atmospheric location in response to such first signals, the response signals including current data based upon barometric pressure in the vicinity of such atmospheric location;

(c) utilizing range data derived from timing differences between the transmitting of such first signals in step (a) and the receiving of response signals in step (b), with geometric data regarding such spaced positions, for deriving data representative of geometric height of the geometric location;

(d) comparing geometric height as derived in step (c) with the current data based upon barometric pressure as received in step (b) from the airborne transponder; and (e) utilizing the results of the step (d) comparison to derive atmospheric deviation data representative of deviation between current data based upon barometric pressure and atmospheric reference data applicable to said atmospheric location.

For a better understanding of the present invention, as well as other and further objects and features, reference is made to the following description taken in conjunction with the accompanying drawings and its scope will be pointed out in the appended claims.

DESCRIPTION OF THE INVENTION

Figure 1:
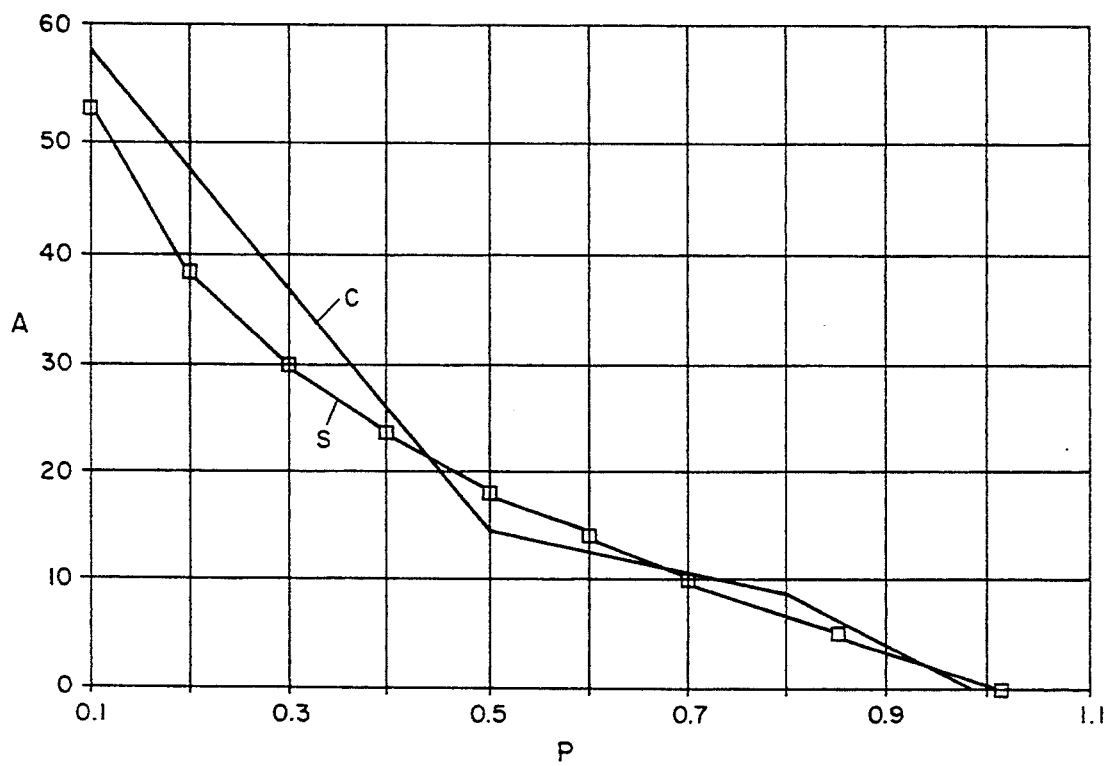
FIG. 1 is a chart showing a standard pressure/altitude profile at S and an illustrative current calibration profile derived using atmospheric deviation data, as shown at C.
Figure 2:
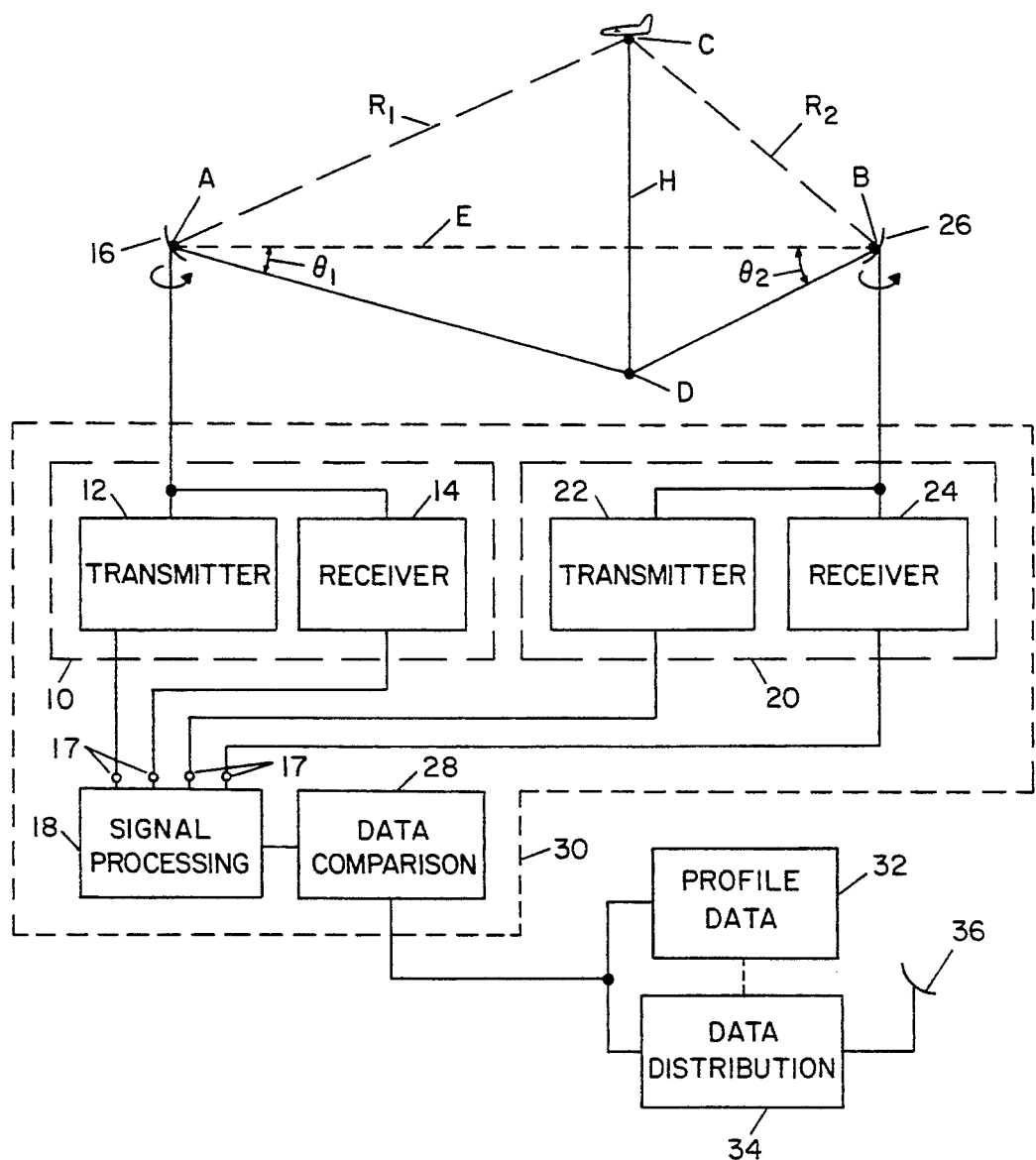
FIG. 2 is a block diagram of a system for deriving atmospheric deviation data in accordance with the invention, including two ground stations for interrogation of an airborne transponder.

A simplified block diagram of a system for deriving atmospheric deviation data in accordance with the invention is shown in FIG. 2. A basic objective in use of the system is to derive deviation data representing the difference, at or about a point in time, between measured barometric pressure and reference or standard atmospheric pressure given by a standard pressure/altitude chart or data, for example. By determining such deviation between measured and reference pressure at a specific atmospheric location (i.e., in the vicinity of a point at a known geometric height above a reference datum level at an identified geographic position), data can be made available for many uses. For example, an aircraft crew can be advised of the relation between barometric altimeter readings and actual geometric height. Also, by gathering such atmospheric deviation data for a significant number of altitudes and geographic areas, the data can be used for weather forecasting and generation of current pressure/altitude profiles.

The FIG. 2 system is arranged to derive atmospheric deviation data in cooperation with an airborne transponder carried by the aircraft shown at point C. Civilian, commercial and military aircraft commonly carry transponders used for identification purposes. These transponders are arranged to automatically transmit response signals, commonly including barometric altimeter data, upon being interrogated by a signal from any interrogator able to transmit the proper form of signal for this purpose. Such transponders are commonly provided and used for applications including air traffic control and military Identification Friend or Foe (IFF) systems. Thus, while the FIG. 2 system operates in cooperation with the airborne transponder carried in the aircraft at point C, in fact, the transponder responds automatically with no requirement for action by the aircraft crew, so long as the transponder is turned on. In this way, the invention makes use of this automatic response including barometric altimeter data, which is widely available from a variety of transient aircraft flying at different altitudes over varying geographic locations at many hours of the day and night. In accordance with the invention, a wide range of atmospheric deviation data can be made available using existing types of equipment, including ground-based interrogator equipment already in operation at many locations, without requiring any dedicated aircraft flights or new airborne equipment.

The system, as illustrated in FIG. 2, includes transmitting means for transmitting first signals and receiving means positioned at known spaced positions for receiving response signals. As shown, the system includes two interrogator sets 10 and 20, each having a transmitter, a receiver and an associated antenna, shown as units 12, 14 and 16, and 22, 24, and 26, respectively. Interrogators 10 and 20, which may be identical units of the commonly used AN/TPX-54(V) military Interrogator Set or other suitable equipment, include transmitter circuitry shown as transmitter 12, for example, for sending first interrogation signals to the airborne transponder located at point C in FIG. 2. Upon receiving a properly encoded interrogation signal, the airborne transponder transmits response signals, which include current altitude data based upon barometric pressure as sensed by the barometric altimeter of the aircraft and converted to barometric altitude data, and may also include aircraft identification and other data. Interrogator 10 also includes receiver circuitry shown as receiver 14, which is arranged to receive the response signals by use of an antenna 16, which is used for both first signal transmission and response signal reception in an appropriate shared manner. In this embodiment, units 10 and 20 are identical and each independently interrogates and receives response signals from the airborne transponder at point C, via the respective antennas 16 and 26. It will be appreciated that interrogators such as 10 and 20, for example, may be positioned at ground locations whose geographic positions, elevations and separations are known on the basis of appropriate surveying techniques, or may be positioned on ships whose positions are known by use of available satellite location systems, or may be otherwise positioned as appropriate. Interrogators may also be positioned on aircraft, such as U.S. Air Force AWACS airborne warning and control system aircraft, remaining aloft in an assigned station area for extended periods of time, which are equipped for position determination by satellite location systems and radar altimeters, for example.

The system, as shown in FIG. 2, also includes signal processing means 18 coupled to the transmitters and receivers of interrogators 10 and 20. Signal processing means 18 is responsive to the timing difference between the transmitting of a first signal by transmitter 12 to the transponder at point C and the receiving by receiver 14 of a response signal from the airborne transponder, such timing differences being representative of the slant range to point C. The signal processing means 18 is thus effective to utilize range data derived from timing differences (the round-trip time required to send and receive a signal) from each of the interrogators 10 and 20, which independently interrogate the transponder in close time proximity with only relatively slight movement of the aircraft between the times of such independent interrogations. The signal processing means 18 also utilizes geometric data regarding the spaced positions of the receivers 14 and 24. For this purpose, the positions of receivers 14 and 24 are effectively the positions A and B, of the respective antennas 16 and 26, which are spaced apart by the known distance E. Data as to the positions, elevations and spacing of the receivers may be coupled to signal processing unit 18 with the data representative of slant ranges or, where receivers such as 12 and 14 are fixed at predetermined positions, may be initially stored in unit 18 for use as required. By conversion of the timing differences, representing round-trip signal transmission time, into the distances travelled by electromagnetic signals in such time periods, the distances to the aircraft, shown as ranges $R_1$ and $R_2$ at the time of signal transmission, can be determined. Aircraft identification data included in the response signals enables the identification and correlation of data received from specific aircraft. As shown, the input data supplied to signal processing means 18, as described above and which may be adapted for both signal and data processing, is coupled from units 10 and 20 via input means, shown as terminals 17 for coupling input data to unit 18.

Antennas 16 and 26 typically are constantly rotating antennas used for interrogating all aircraft within a volume of airspace around the antenna position, permitting information also to be made available as to the azimuth angle at which the response signals were received from the airborne transponder. In FIG. 2, the angles $\Theta_1$ and $\Theta_2$ represent the angles at which response signals are received by receivers 14 and 24, respectively, from the airborne transponder at point C which, as shown, is directly above point D in the vertical direction. As will be further described below, the geometric data regarding the predetermined spacing E of the receivers 14 and 24 positioned at points A and B, the distances $R_1$ and $R_2$ and the angles $\Theta_1$ and $\Theta_2$, are utilized in signal processing means 18 to derive data representative of the geometric height of the transponder, i.e., the vertical height H of the point C which is the atmospheric location of the aircraft when the transponder response signals were transmitted.

The FIG. 2 system for deriving atmospheric deviation data also includes comparison means, shown as data comparison unit 28, for deriving atmospheric deviation data. Comparison means 28 utilizes the geometric height data from signal processing unit 18 and current data based upon barometric pressure in the form of the previously discussed barometric altimeter data provided by the airborne transponder, as included in the response signals. It will be appreciated that since the data comparison unit 28 now has available to it both the geometric height H of the atmospheric location C, as well as current data based upon the barometric pressure as measured at point C, a variety of forms of atmospheric deviation data can be provided. A comparison of geometric height and indicated barometric altitude provides a deviation factor usable to convert barometric readings to approximate geometric height. Since the barometric altimeter reading from the aircraft represents a barometric pressure reading conversion to altitude based upon data such as found in a standard pressure/altitude table, knowledge of the actual geometric height and its respective standard pressure value permits development of a factor representing the deviation between measured barometric pressure and standard atmospheric pressure. Such factors are usable for weather forecasting and atmospheric profiling, for example. Similarly, if the airborne transponder is configured to provide the current data in the response signals in the form of actual barometric pressure readings (rather than altitude data based upon barometric pressure), the geometric height data could be used to access atmospheric pressure/altitude reference profile data to provide a reference pressure value to be compared to the measured barometric pressure to derive a current pressure/standard pressure factor usable for weather forecasting, atmospheric profiling and other purposes.

It should be noted that the even-numbered elements 10-28, as described, effectively comprise a basic system for deriving barometric deviation data which can be used alone or in combination with other similar or comparable systems at separated geographic sites to develop data covering a more extensive geographical area.

As illustrated in FIG. 2, the system also comprises profile means, shown as profile data unit 32, coupled to the comparison unit 28, for using the atmospheric deviation data for deriving atmospheric profile data. The atmospheric profile data derived by unit 32 may be used in the form of data relating to one or more isolated atmospheric locations, or may be combined with other data to provide comprehensive profiles for a geographic local, national or global area, depending on actual requirements and availability of data. Government and other weather bureaus and atmospheric study and analysis groups already employ capabilities for generation of atmospheric profiles and for other applications and it is a primary objective of the invention to provide practical and economical sources of data, rather than to address specific end-use implementations which can be carried out by those skilled in such fields.

The FIG. 2 system is also shown as including data distribution means, shown as data distribution unit 34, for transmitting to an aircraft, via antenna 36, an altitude correction factor usable for conversion of barometric altimeter readings to approximate geometric height. Distribution unit 34 can be configured to the particular application. With connection to data comparison unit 28, distribution unit 34 can be used to provide a specific correction factor to an aircraft which has just provided response signals including barometric altimeter data. With connection to profile unit 32, distribution unit 34 can be used to provide general barometric altitude correction factors, in response to an aircraft request, by using pressure/altitude profile data developed from data previously provided through prior interrogation of other aircraft. Thus, even if the aircraft requesting such barometric factor information does not carry a transponder, information can be provided based on analysis of data previously provided by transponder-equipped aircraft flying through the same general airspace. Data distribution unit 34 can also be used to transmit data to a central point, by microwave link or any appropriate means, for accumulation and application of data relevant to a more extensive geographical area.

Figure 2A:
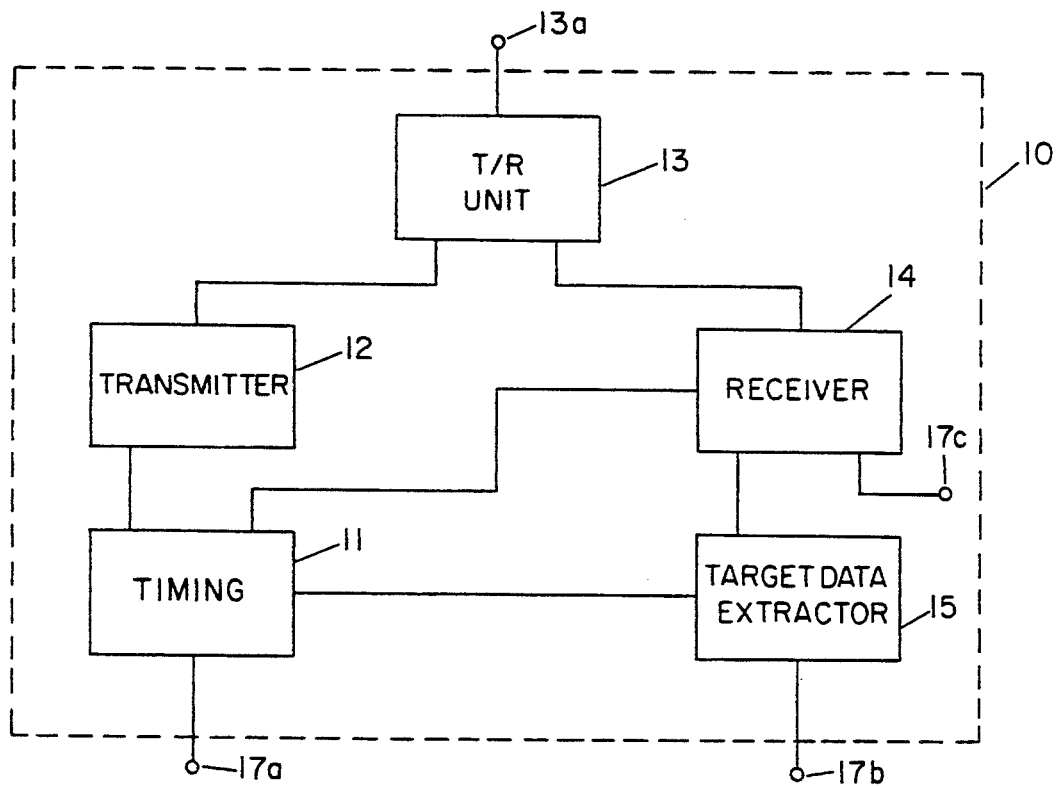
FIG. 2A is a block diagram illustrating a specific embodiment of interrogator unit 10 of FIG. 2.

FIG. 2A provides a more detailed block diagram of unit 10 or 20 of FIG. 2, in the form of a simplified functional diagram of an AN/TPX-54 (V) Interrogator Set which is widely used as a basic collocated transmitter/receiver arrangement in military and modified configurations. Interrogator 10, as illustrated in FIG. 2A, includes transmitter 12, which receives timing and control signals from timing means 11 and provides interrogation signals to output terminal 13a via transmit/receive unit 13. T/R unit 13 is typically a diplexer for coupling output signals to output terminal 13a, while substantially isolating receiver 14 from output interrogation signals. For reception of response signals, T/R unit 13 provides an effective receive signal path to receiver 14. As shown, receiver 14 receives timing and control signals from timing unit 11 for control of range gates for signal reception, for example. Upon receiving response signals from a transponder, as shown at point C in FIG. 2, receiver 14 provides a video signal representation of received data at terminal 17c, which is usable to display information on a screen for an air traffic controller and also for other purposes, and also provides a representation of received data to target data extractor means 15. In this configuration, the TDE unit 15 of the interrogator derives digital target reports including data as to the range, azimuth, identification and barometric altitude of the aircraft carrying the transponder providing response signals from transmitter 12. These digital target reports are provided in a signal format readily transmittable to other locations, via terminal 17b, for further processing in accordance with the invention. In embodiments which do not include a target data extractor as such, video type signals provided at terminal 17c can be processed in known manner in preparation for transmission or distribution to other local or remote units of the system. As shown in FIG. 2A, timing signals for reference and time base synchronization are provided at terminal 17a. In this configuration, terminals 17a and 17b would be coupled to signal processing unit 18 of FIG. 2, via suitable ones of terminals 17 in FIG. 2.

The AN/TPX-54 (V) interrogator, set as illustrated in simplified form in FIG. 2A, operates basically as follows. Encoded interrogation signals are transmitted at 1030 MHz to transponder-equipped aircraft to elicit response signal replies at 1090 MHz consisting of identification and barometric altitude data. The received signals are subsequently processed by the target data extractor to derive a single digital target report for each aircraft within system coverage on each rotation of an associated directional antenna. Elapsed time difference between interrogation transmission and reply detection provides a value of slant range distance to the responding aircraft, which is quite accurate for intended purposes. Aircraft azimuth relative to the rotating antenna is derived by an algorithm used to estimate the "center-of-gravity" of the reply sequence representing a number of interrogations and responses during antenna beam passage across the aircraft position. The target report data, which can either be used locally or sent to remote locations, comprises range data in 1/64 mile increments, azimuth data in 0.044 degree increments, one of 4,096 discrete identification codes, and barometric altitude data in 100 foot steps from −1,000 feet to more than +100,000 feet. Timing data, basically providing interrogation signal transmission reference timing data, can be combined with the digital target report data or distributed separately. In the operation of interrogator equipment as currently employed, all signals transmitted through space are in accordance with U.S. national and international standards and systems which are variously known as Air Traffic Control Radar Beacon System, Mark X SIF, Mark XA, and Secondary Surveillance System. This specific description of the AN/TPX-54 (V) and its application to systems in accordance with the invention represents a currently contemplated best mode of implementation and will provide an understanding of the invention effective to enable those skilled in the field to implement various other embodiments.

Figure 3:
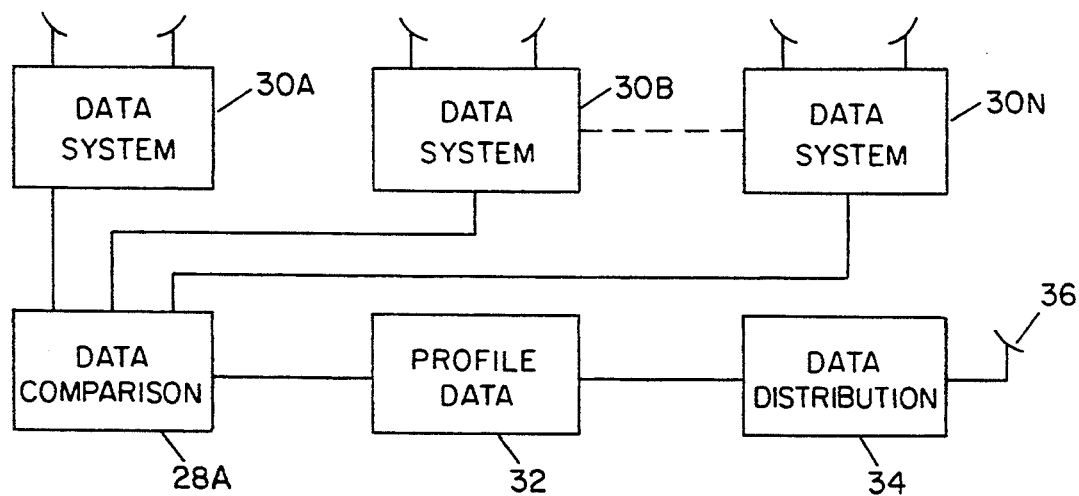
FIG. 3 is a block diagram of a system in accordance with the invention, which includes three FIG. 1 systems arranged to derive atmospheric deviation data for a wider geographic area.

Referring now to FIG. 3, there is illustrated a system for providing atmospheric profile data which includes a plurality of systems 30A, 30B and 30N, each of which is similar to system 30 in FIG. 2. One difference is that, whereas in FIG. 2 data comparison means 28 is included as a component unit of system 30, in FIG. 3 data comparison means 28A comprises a single unit arranged to receive data from signal processing means (as shown at 18 in FIG. 2) included in each of the systems 30A, 30B and 30N. The actual configuration in a particular application is considered a matter of choice for those skilled in the art once having received the benefit of the teaching of the invention. Units 28A, 32, 34 and 36 of FIG. 3 may be generally as shown and described with reference to corresponding units in FIG. 2. It will be appreciated that by having individual systems 30A, 30B and 30N dispersed to separated geographic sites, the FIG. 3 system has the capability of deriving atmospheric profile data, such as pressure/altitude profiles, covering a more extensive geographical area than could be covered by a single system as in FIG. 2.

Figure 4:
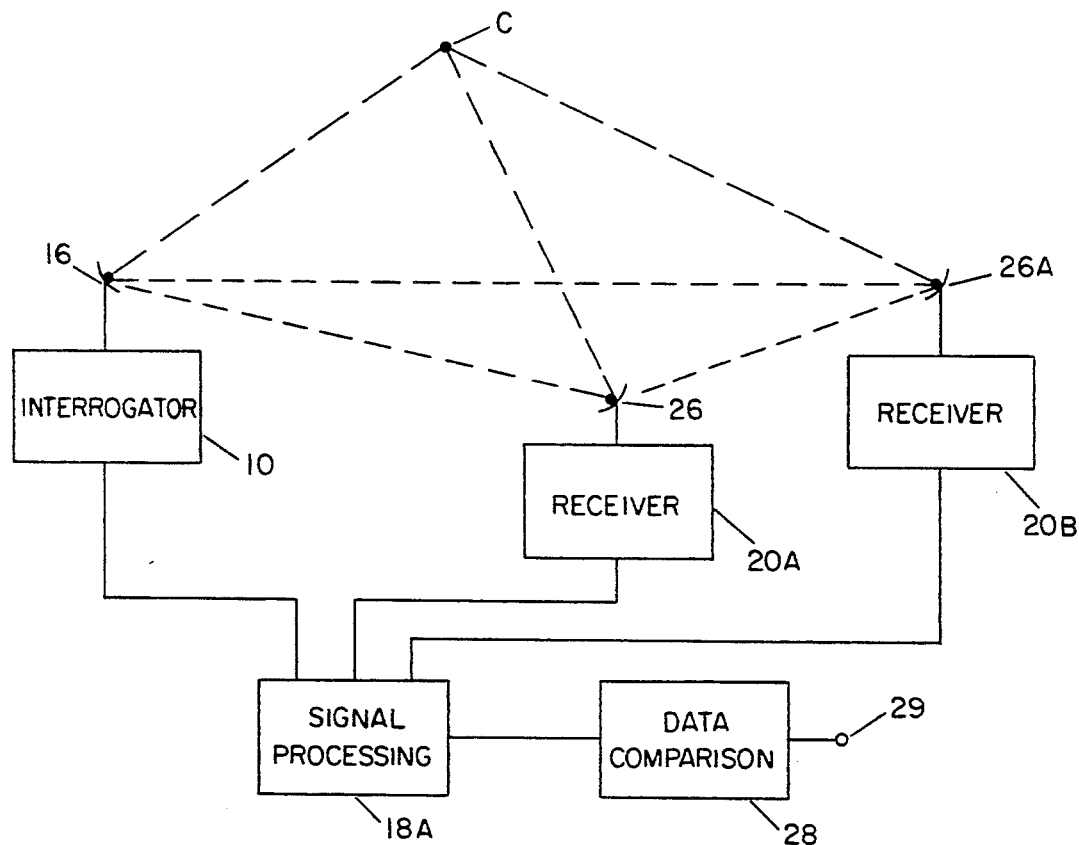
FIG. 4 is a block diagram of a system in accordance with the invention including three stations at spaced locations.

FIG. 4 shows a system in accordance with the invention which is arranged for operation with receiving means at three spaced positions for receiving response signals from an airborne transponder at point C. The FIG. 4 system includes three antennas 16, 26, and 26A at spaced positions to determine a triangle, as will be discussed below in the description of operation with reference to FIG. 10. In the FIG. 4 embodiment, as illustrated, unit 10 is an interrogator as shown at 10 in FIG. 2, including a transmitter and a receiver. Units 20A and 20B in FIG. 4 include receivers, such as receiver 24 described with reference to FIG. 2, but may exclude transmitters, such as shown at 22 in FIG. 2. Signal processing unit 18A in FIG. 4 is generally identical to unit 18 in FIG. 2, except that it is arranged to receive inputs from the three units 10, 20A and 20B. In this configuration, the geometric characteristics of a base triangle (points A, B and E in FIG. 10) are determined by the spaced positions of antennas 16,26 and 26A. With transmission of a first interrogation signal from interrogator 10 and reception of the resulting response signal at all three of units 10, 20A and 20B, range data to point C from three positions is made available by the provision of a reference or timing signal from unit 10, which represents the time of transmission of the interrogation signal. As described further with reference to FIG. 10, with the availability of data on range from each of the three receiving positions and the geometric data defining the base triangle, the geometric height of the atmospheric location C can be determined without requirement for availability of azimuth data from units 10, 20A and 20B. This serves to point up the fact that once the present invention is understood by skilled individuals, different geometric models and methods of implementing the necessary geometric determinations will be a matter of choice in view of particular applications and objectives in use of the invention. In FIG. 4 data comparison unit 28 is provided as described with reference to FIG. 2 and units 32 and 34 and data transmission antenna 36 may be similarly included by connection to terminal 29.

Figure 5:
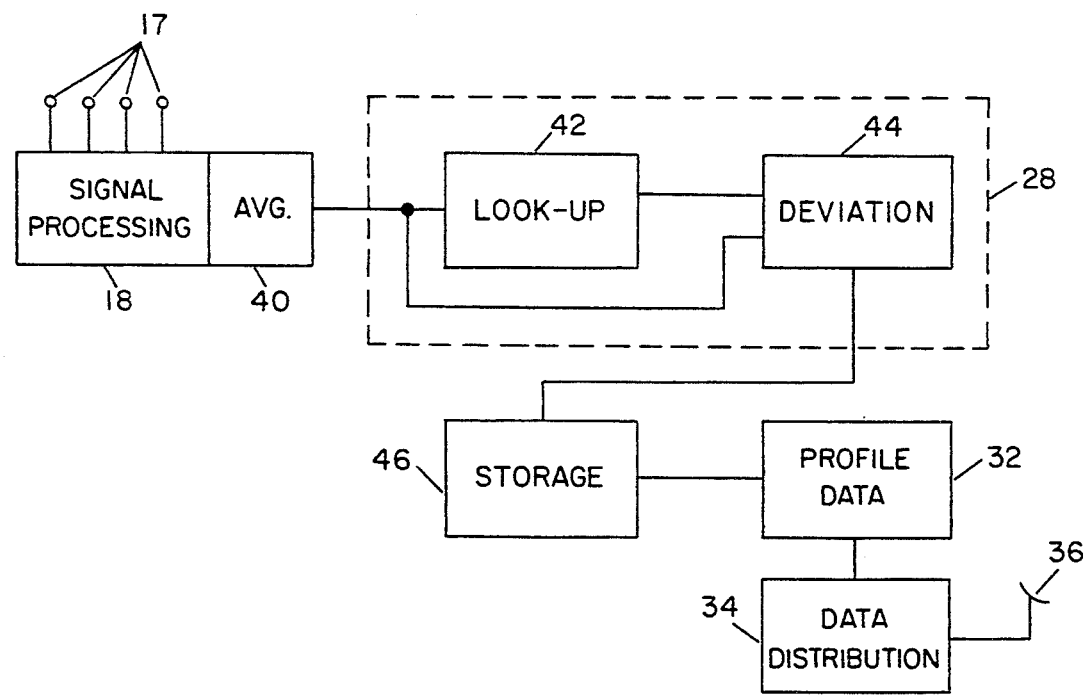
FIG. 5 is a block diagram of a system in accordance with the invention showing certain specific subsystems.

FIG. 5 illustrates a system for deriving atmospheric deviation data which does not specifically include the transmitter, receiver and antenna means of FIG. 2. Instead, there are provided input means, shown as terminals 17, for coupling input data. The input data will desirably include data based upon barometric pressure measured in the vicinity of an atmospheric location and range data representative of approximate distances to the atmospheric location from a plurality of reference points at spaced positions, and which may include azimuth data representative of approximate azimuths of said atmospheric location relative to those reference points. Thus, such data, which has been discussed with reference to the FIG. 2 embodiment, may be developed by a FIG. 2 type transmitter/receiver/antenna combination or in other suitable manner and provided to an appropriate arrangement of input terminals such as represented at 17 in FIG. 5.

In the FIG. 5 embodiment, units 18, 28, 32, 34 and 36 may be basically as shown and described with reference to FIG. 2. As shown, signal processing unit 18 has been modified to incorporate smoothing means 40 for enhancing the accuracy of range data by combining successive portions of the data representative of measurements of the distance to said atmospheric location from the same one of the reference points. Thus, for example, range data representing successive transmitting of first signals and receiving of response signals by a specific receiver are averaged using known techniques in order to smooth or average out responder signal response tolerance errors so as to enhance the accuracy of the range data. Such smoothing of the range data is carried out separately for range data relating to each of the reference points, for example, to enhance subsequent determination of the geometric height of the atmospheric location.

In FIG. 5, data comparison means 28 is shown as additionally comprising look-up means 42 and deviation derivation means 44. Unit 42 may be any suitable form of equipment or system of a known type usable for storing a quantity of data values, in this case a table of pressure values for different atmospheric heights representing a standard pressure/altitude profile, such as provided by ICAO. In operation, when data representing the geometric height of an atmospheric location is provided by unit 18, look-up unit 42 provides reference data representing the ICAO standard pressure for that height. Deviation derivation unit 44 then receives inputs representing both that standard pressure and, from unit 18/40, the data representing barometric pressure actually measured in the vicinity of the atmospheric location. Unit 44 is thus enabled to compare such inputs in order to derive atmospheric deviation data representative of the difference between the measured and reference data applicable to the atmospheric location of interest.

The FIG. 5 embodiment also includes storage means 46, coupled between unit 28 and profile data unit 32, for storing atmospheric deviation data. Storage unit 46 may be any suitable form of data storage unit for permitting the storage and retrieval in known manner of atmospheric deviation data derived with respect to a plurality of atmospheric locations representing geometric heights at one or more geographic locations to permit accumulation and use of such data for development of atmospheric pressure/height profiles and other purposes.

Geometric Determinations and Methods of Operation

The following addresses determination of height using geometric relationships and introduces the factor of signal turnaround delay. When an airborne transponder of the type referred to receives an interrogation signal, it must decode such signal and formulate and transmit a response signal. The elapsed time required to perform those functions results in a delay between the time the first signal reaches a transponder and the time at which the response signal leaves the transponder. That elapsed time will be termed the "turnaround delay". Ideally, the round trip time between transmission of a first signal by a ground-based interrogator and receipt of the response signal by that interrogator would depend solely upon the distance between the interrogator and airborne transponder. In actuality, the turnaround delay introduces an error by making the round trip time longer. As a practical matter, however, it is considered that the turnaround delay introduced by common types of airborne transponders does not reduce system accuracy below the accuracy level required for presently contemplated applications. Nevertheless, in accordance with the present invention, systems and methods are provided which include determination and/or correction for turnaround delay, so that barometric deviation data may be derived with or without correction for turnaround delay, depending on requirements in particular applications.

Figure 6:
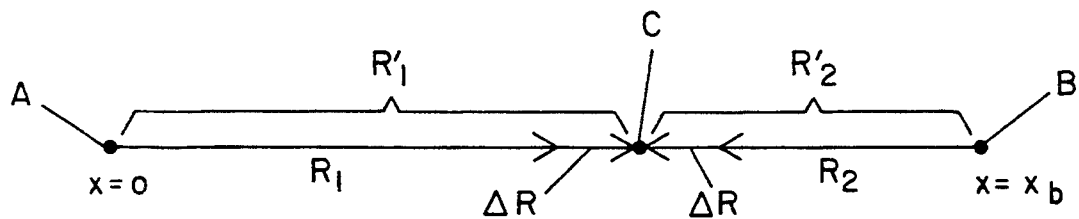
FIG. 6 is a one-dimensional conceptual diagram useful in describing the invention.

FIG. 6 shows a one-dimensional conceptual model of the FIG. 2 system. This is basically an academic case provided for purposes of heuristic development. In FIG. 6 the position of the transponder at point C lies along the line between the positions A and B of the interrogators 10 and 20 of FIG. 2. As shown, point A is located at position $x=0$ and point B is located at position $x=x_b$. In this example, the interrogator is assumed to introduce a turnaround delay, with the result that the ranges to point C from points A and B (as determined by the timing differences between transmitting interrogation signals and receiving response signals) each include an incremental range error representing the effect of the turnaround delay, shown as the distance $\Delta R$, which has been exaggerated for purpose of illustration. Thus, the respective timing differences, as initially measured at points A and B, correspond to the distances $R_1'$ and $R_2'$, respectively. In this illustration, the turnaround delay is shown as increasing each of the range values by $\Delta R$, whereas $R_1$ and $R_2$ should equal the known baseline value $x_b$. The baseline value between points A and B represents a predetermined distance as measured by a satellite positioning system or other method.

Thus, the difference between the points A and B as determined using signal timing differences and the measured distance between those points is equal to twice the error introduced by the turnaround delay. As a result, $$\Delta R = \frac{(R_1' + R_2') - x_b}{2} \quad (1)$$

which can be solved to determine $\Delta R$, and thereby $R_1$, which is equal to $R_1'$ less $\Delta R$, and $R_2$. This is straightforward, particularly since we already know that on an error-free basis $R_1 + R_2 = x_b$.

Figure 7:
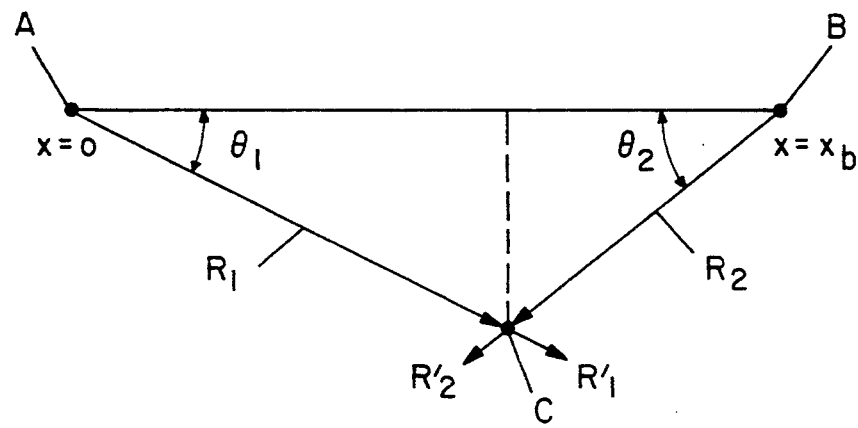
FIG. 7 is a two-dimensional diagram, useful in describing the invention.

The two dimensional case illustrated in FIG. 7 is considered next. In FIG. 7, it will be seen that, whereas the distances as determined by the round trip signal transmission and reception timing differences are indicated by the total vectors $R_1'$ and $R_2'$, the transponder is actually located at point C. Point C is again separated by the actual ranges $R_1$ and $R_2$ from the points A and B respectively. It follows that, $$R_1' \sin \Theta_1 + R_2' \sin \Theta_2 > x_b \quad (2)$$

and the excess is $\Delta R (\sin \Theta_1 + \sin \Theta_2)$ which can be solved deterministically or by incrementally reducing the values of the measured distances by equal amounts until the inequality in equation (2) is equalized. The values for the included angles are provided by the angles of reception of the response signals at the interrogators.

Figure 8:
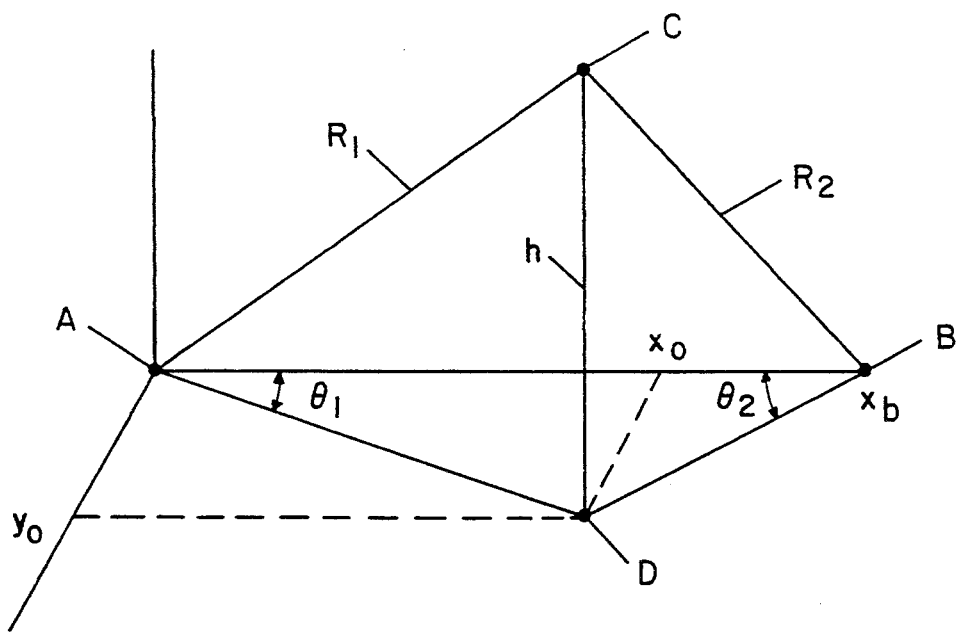
FIG. 8 is a three-dimensional diagram useful in describing the invention.

A three dimensional case assumed to not be subject to errors introduced by turnaround delays, as illustrated in FIG. 8, will now be considered. The azimuth data obtained from the interrogator units 10 and 20 at points A and B is used to determine the position of point D in the horizontal xy plane. As shown, h is a vertical line representing the geometric height of the airborne transponder at point C, lying directly above point D. With point B at $x_b$ and point D located at the coordinates $x_0$, $y_0$ then, $$R_1^2 = x_0^2 + y_0^2 + h^2 \quad (3)$$

and $$R_2^2 = (x_b - x_0)^2 + y_0^2 + h^2 \quad (4)$$

which are the equations for two spheres that, absent turnaround delay, are tangent at the point of solution and h is thereby determined.

When errors are introduced as a result of the presence of transponder turnaround delays, the two spheres intersect and form a circular locus. One approach to solution for the actual ranges is to incrementally reduce the values of $R_1'$ and $R_2'$ until the two spheres become tangential. This may be more readily seen if the pair of simultaneous equations (3) and (4) are subtracted to cancel h (which will still be inherent in the range values) to provide, $$R_1^2 - R_2^2 = 2x_b x_0 - x_b^2 \quad (5)$$

Alternatively, the three dimensional model, shown in FIG. 9 as including range errors $\Delta R$ resulting from turnaround delays, may be addressed as follows. To summarize the arrangement, interrogators 10 and 20 are positioned at points A and B, respectively, with a known baseline distance separating them. Each interrogator actively and autonomously interrogates passing aircraft having airborne transponders and derives target reports at a rate of one item of report data per aircraft per 360 degree antenna revolution or sector scan, including information as to range, azimuth, aircraft identification and barometric pressure/altitude data. It should be noted that each such item of report data will normally encompass a plurality of interrogations and responses occurring in a short period during which the main beam of the radiation pattern of the rotating antenna is directed at an aircraft during each antenna revolution or scan and the resulting repetitive range data can be used for smoothing purposes as discussed above with reference to FIG. 5.

Figure 9:
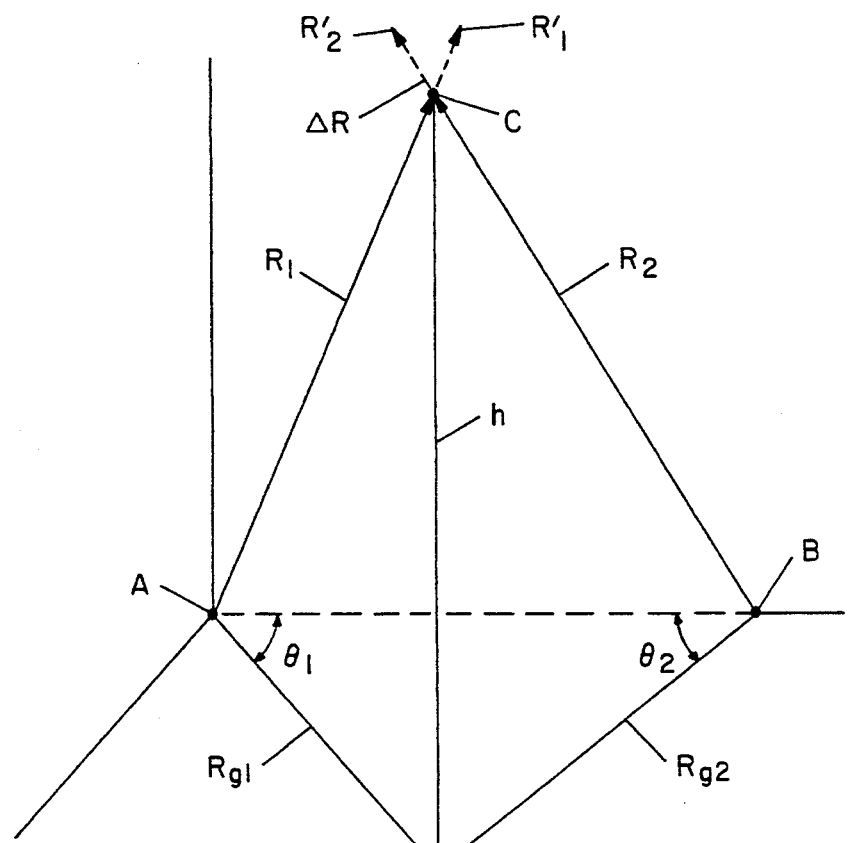
FIG. 9 is a diagram useful in describing a two ground station system in accordance with the invention.

As between the two interrogators at points A and B in FIG. 9, a common time reference, including provision for processing and data transmission delays, permits correlation of data received from a specific airborne transponder as the result of interrogation by both interrogators with only minimal time-spacing between the two separate interrogations, so that the aircraft is in substantially the same atmospheric location when responding to each interrogator. Such common time reference also facilitates conventional track-smoothing and use of prediction algorithms for time-consistent positional extrapolation for increased accuracy in determining geometric height. Thus, the turnaround delay for a given airborne transponder (which may have a specification value of $3\mu$ seconds, for example) may actually vary within a tolerance ($\pm 0.5\mu$ seconds, for example) on different interrogations, so that smoothing to average the range value over a plurality of interrogations can provide increased accuracy of measured range data.

In FIG. 9, the total slant range vectors $R_1'$ and $R_2'$ include both the actual ranges to the point C, as well as the $\Delta R$ errors introduced by the turnaround delay in the airborne transponder. The angles $\Theta_1$ and $\Theta_2$ are determined by the measured azimuths from the respective points A and B. The triangle in the xy plane is completely defined by the baseline distance $x_b$ and the included angles, thereby determining the distances $R_{g1}$ and $R_{g2}$, which are the ground plane distances to point D lying vertically below airborne transponder location C. As shown, points A, D, and C define a first vertical triangle lying in a vertical plane which intersects airborne transponder location C, and points B, D and C define a similar vertical triangle. The geometric height h is common to both of these triangles, so that, $$R_1^2 - R_{g1}^2 = R_2^2 - R_{g2}^2 \tag{6}$$

for the case in which there is no turnaround delay. With the presence of turnaround delay, $$(R_1' - \Delta R)^2 - R_{g1}^2 = (R_2' - \Delta R)^2 - R_{g2}^2 \tag{7}$$

and $$\Delta R = \frac{(R_{g1}^2 - R_{g2}^2) - (R_1'^2 - R_2'^2)}{(R_2' - R_1')} \tag{8}$$

These equations can be solved in known manner in order to determine the geometric height h of the atmospheric location of the airborne transponder at the time the data was provided to the two interrogators. It should be noted, however, that in two special cases the height cannot be determined. The above expressions are indeterminate when $R_2'$ and $R_1'$ are equal, and lack a meaningful solution when point D lies along the baseline between points A and B. In the operation of a system for deriving barometric deviation data according to the invention, data collected in these very specific circumstances can generally be discarded without seriously constraining the overall data collection process.

In view of the foregoing, it will be apparent that other known analysis techniques, such as use of conical sections, can be applied for determination of values of geometric height. In addition, data as to the elevation of the receiving points can be utilized in the computations so as to relate determination of geometric height to a defined datum level, such as MSL. Also, once the foregoing examples and analysis are understood, arrangements applying the invention to other geometric models will become obvious to those skilled in the art. For example, the indeterminate points discussed with reference to the FIG. 9 system can be avoided by a three station system, such as illustrated in FIG. 4 and represented by the FIG. 10 diagram. Briefly considered, in the system of FIGS. 4 and 10, three ground-based receivers are located at points A, B and E, with all three of the interconnecting baseline distances and included angles determined by appropriate measurements and calculations. In this arrangement, the geometric height of an airborne transponder at point C is represented by line h between points C and D. The side triangles of the resulting pyramid, as shown, do not lie in vertical planes, except in special cases in which point D falls along one of the baselines. The orthogonal projection from the apex C of the pyramid to the xy plane defines an angle between the x axis and the point D lying vertically below the apex C.

Figure 10:
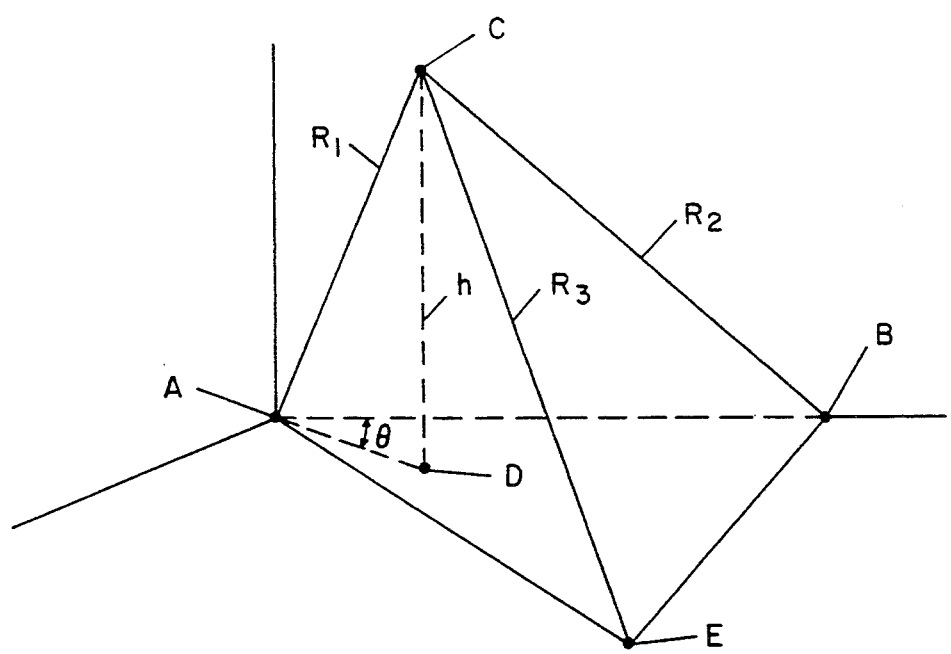
FIG. 10 is a diagram useful in describing a three ground station system in accordance with the invention.

In the FIG. 10 embodiment, the station at point A includes an active interrogator/receiver unit, while the stations at points B and E comprise receivers operating independently of co-located transmitters. In this arrangement, the active station at A distributes accurate timing reference data to the two passive receiver stations at points B and E. Following transmission of a first interrogation signal from station A, the resulting response signal transmitted by the airborne transponder at point C is received by the individual receivers at each of points A, B and E. Upon determination of the slant ranges to the point C from each of the three receivers, using the time reference data as to the time of transmission of the single interrogation signal, the geometric dimensions of the pyramid are completely defined so as to permit determination of the height h. This discussion of the FIG. 4 system, as represented by FIG. 10, has ignored the presence and effects of turnaround delays. In FIG. 10, it will be seen that a vertical plane is defined by the vertical height line h and the line joining points A and C. By comparing the computed angle $\Theta$ between this plane and the baseline A-B, with the measured azimuth angle e as included in the data from station A, an indication of the error introduced by turnaround delay can be derived. If the angle as determined by each method has substantially the same value, it may be concluded that no correction in the range data is necessary. If the angle values are different, the time-delay measured ranges between point C and points A, B and E can be equally incrementally shortened until equality between the measured and computed angles is achieved.

With respect to the determination of turnaround delay, it is expected that the turnaround delay for a specific airborne transponder, or for a specific model of airborne transponder, may represent a fixed delay of a value which, within equipment design tolerances, does not vary appreciably over time or between units of a specific model, as the case may be. This being so, it may be desirable to apply an embodiment of the invention arranged to effectively determine the turnaround delay associated with a specific unit or a specific model of airborne transponder. Such delay, once determined, may then be stored in a manner so that each response signal from a particular airborne responder includes data as to its turnaround delay, along with data representing barometric pressure/altitude and aircraft identification. Alternatively, data specifying the turnaround delay for a particular transponder unit or model may be stored in data storage facilities of a ground system embodiment in accordance with the invention, for retrieval and application each time response signals from the identified transponder unit or model are received for processing to derive barometric deviation data.

As a general matter, it will be understood that the objective is to determine a close estimate of the actual geometric height of the atmospheric location of the airborne transponder, so that such height can be used in comparisons to measured barometric pressure/altitude at or about the same atmospheric location to derive atmospheric deviation data. Also, it is expected that in most applications the magnitude of error introduced by turnaround delay will be of such relatively small significance to the overall required accuracy of the desired data, that it will not be necessary to determine or correct measured range values for turnaround delays.

While there have been described the currently preferred embodiments of the invention, those skilled in the art will recognize that other and further modifications and variations may be made without departing from the invention and it is intended to claim all such modifications as fall within the full scope of the invention.

What is claimed is:

1. A system for deriving atmospheric deviation data for a location in the atmosphere, in cooperation with an airborne transponder which provides response signals including data based upon barometric pressure, comprising:
   one or more transmitting means for transmitting first signals to said airborne transponder;
   a plurality of receiving means, positioned at spaced positions, for receiving response signals transmitted by said airborne transponder from an atmospheric location in response to said first signals, said response signals including data based upon barometric pressure in the vicinity of said atmospheric location;
   signal processing means, coupled to said receiving means and responsive to timing differences between said transmitting of said first signals and said receiving of said response signals, said signal processing means utilizing data regarding said spaced positions of said receiving means to derive data representative of geometric height of said atmospheric location; and
   comparison means, coupled to said signal processing means, utilizing said data representative of geometric height and said data based upon barometric pressure to derive atmospheric deviation data representative of deviation between said data based upon barometric pressure and atmospheric reference data applicable to said atmospheric location.

2. A system for deriving atmospheric deviation data as in claim 1, additionally comprising atmospheric profile means, coupled to said comparison means, using said atmospheric deviation data to derive atmospheric profile data, representing atmospheric condition above a geographic area, based upon response signals received from one or more airborne transponders at a plurality of atmospheric locations within a predetermined time period.

3. A system as in claim 2, additionally comprising data distribution means, coupled to said barometric profile means, for transmitting data for further use or analysis. to derive atmospheric profile data, representing atmospheric conditions above a geographic area, based upon response signals received from one or more airborne transponders at a plurality of atmospheric locations within a predetermined time period.

4. A system as in claim 2, wherein said atmospheric profile means also uses data regarding the elevation of each transmitting means and receiving means in order to normalize data to a desired datum plane.

5. A system, utilizing a plurality of data systems as described in claim 1, for providing atmospheric profile data comprising:
   a plurality of said data systems positioned at separated geographic sites; and
   atmospheric profile means, coupled to the comparison means of each of said plurality of data systems, for deriving atmospheric profile data representing atmospheric conditions above a geographic area, in response to atmospheric deviation data provided by said comparison means of said plurality of data systems representing response signals received from one or more airborne transponders at a plurality of atmospheric locations within a predetermined time period.

6. A system for deriving atmospheric deviation data as in claim 1 wherein one of said transmitting means and one of said receiving means are collocated as units of an interrogator system which additionally comprises:
   timing means, coupled to said transmitting means, for providing timing reference signals; and
   target data extractor means, coupled to said receiving means, for deriving digital target report data including range, azimuth, identification and barometric altitude data relating to said airborne transponder;
   and wherein said digital target report data and timing reference signals from said timing means are coupled to said signal processing means and utilized with said data regarding said spaced positions of said receiving means to derive geometric height data, and said barometric altitude data and said geometric height data are coupled to said comparison means for deriving atmospheric deviation data.

7. A system for deriving atmospheric deviation data as in claim 6, additionally comprising atmospheric profile means, coupled to said comparison means, using said atmospheric deviation data to derive atmospheric profile data, representing atmospheric conditions above a geographic area, based upon response signals received from one or more airborne transponders at a plurality of atmospheric location within a predetermined time period.

8. A system for deriving atmospheric deviation data as in claim 1, wherein said data based upon barometric pressure in the vicinity of said atmospheric location comprises barometric altimeter data and said comparison means utilizes said barometric altimeter data and said data representative of geometric height to derive atmospheric deviation data representative of deviation between barometric altimeter readings and geometric height in the vicinity of said atmospheric location at or about the time of said transmission of said response signals by said airborne transponder.

9. A system for deriving atmospheric deviation data as in claim 8, additionally comprising data distribution means, coupled to said comparison means, for transmitting to an aircraft an altitude correction factor representative of atmospheric conditions in the vicinity of said atmospheric location, said factor being usable for conversion of barometric altimeter readings to approximate actual geometric height.

10. A system for deriving atmospheric deviation data as in claim 1, wherein said data based upon barometric pressure in the vicinity of said atmospheric location comprises barometric altimeter data and said comparison means utilizes said barometric altimeter data and said data representative of geometric height to derive atmospheric deviation data representative of deviation between measured barometric pressure in the vicinity of said atmospheric location and reference atmospheric pressure for an altitude similar to the altitude of said atmospheric location.

11. A system for deriving atmospheric deviation data as in claim 1, wherein said comparison means comprises means utilizing said data based upon barometric pressure and said data representative of geometric height, together with atmospheric pressure/altitude reference profile data, to derive atmospheric deviation data representative of deviation between measured barometric pressure in the vicinity of said atmospheric location and reference atmospheric pressure for said atmospheric location from said atmospheric pressure/altitude reference profile data.

12. A system for deriving atmospheric deviation data as in claim 1, wherein there is included only one transmitting means and said transmitting means is co-located with one of three spaced, fixed-site receiving means.

13. A system for deriving atmospheric deviation data as in claim 1, wherein there are included a plurality of transmitting means, each of which is co-located with one of a like-plurality of spaced, fixed-site receiving means.

14. A system for deriving atmospheric deviation data for a location in the atmosphere, in cooperation with an airborne transponder providing response signals which may be subject to signal turnaround delay and which include current barometric altitude data, comprising:
one or more transmitting means for transmitting first signals to said airborne transponder;
a plurality of receiving means, positioned at spaced positions, for receiving response signals transmitted by said airborne transponder from an atmospheric location in response to said first signals, said response signals being subject to a signal turnaround delay and said response signals including barometric altitude data based on current barometric pressure in the vicinity of said atmospheric location;
signal processing means, coupled to said receiving means and responsive to timing differences between said transmitting of said first signals and said receiving of said response signals, said signal processing means utilizing data regarding said spaced positions to adjust said timing differences to compensate for said signal turnaround delay to provide adjusted timing differences, and utilizing said adjusted timing differences to derive data representative of geometric height of said atmospheric location; and comparison means, coupled to said signal processing means, utilizing said data representative of geometric height and said barometric altitude data from said airborne transponder to derive atmospheric deviation data representative of deviation between said barometric altitude data and atmospheric pressure reference data applicable to said atmospheric location.

15. A system for deriving atmospheric deviation data for a location in the atmosphere comprising:
input means for coupling input data including data based upon barometric pressure measured in the vicinity of an atmospheric location and range data representative of approximate distances to said atmospheric location from a plurality of reference points at spaced positions, and which may include azimuth data representative of approximate azimuths of said atmospheric location relative to said reference points;
signal processing means, coupled to said input means, utilizing said range data, available azimuth data as may be selected, and data regarding said spaced positions of said reference points to derive data representative of the geometric height of said atmospheric location; and
comparison means, coupled to said signal processing means, utilizing said data representative of geometric height and said data based upon barometric pressure to derive atmospheric deviation data representative of deviation between said data based upon barometric pressure and atmospheric reference data applicable to said atmospheric location.

16. A system as in claim 15, wherein said comparison means comprises:
look-up means, coupled to said signal processing means, for utilizing said data representative of geometric height to identify and make available atmospheric reference data pertinent to the vicinity of said atmospheric location; and
deviation derivation means, coupled to said look-up means, for comparing said data based upon barometric pressure to said atmospheric reference data to derive atmospheric deviation data representative of the difference between barometric pressure measured in the vicinity of said atmospheric location and reference data applicable to said atmospheric location.

17. A system as in claim 15, wherein said signal processing means includes smoothing means for enhancing the accuracy of range data by combining successive portions of said data representative of the distance to said atmospheric location from one of said reference points.

18. A system as in claim 15, additionally comprising:
storage means, coupled to said comparison means, for storing atmospheric deviation data derived with respect to a plurality of atmospheric locations representing geometric heights at one or more geographic locations; and
atmospheric profile means, coupled to said storage means, using said barometric deviation data to derive atmospheric profile data representing atmospheric conditions above a selected geographic area.

19. A system, for determining geometric height in cooperation with an airborne transponder providing response signals, comprising:

one or more transmitting means for transmitting first signals to said airborne transponder;

a plurality of receiving means positioned at spaced positions, for receiving response signals from said airborne transponder in response to said first signals; and signal processing means, coupled to said transmitting means and responsive to timing differences between said transmitting of said first signals and said receiving of said response signals, said signal processing means utilizing data regarding said spaced positions to determine geometric height of said airborne transponder. representing successive cycles of transmitting of a said first signal by said transmitting means and receiving of a said response signal by the same one of said receiving means.

20. A system as in claim 19, wherein said signal processing means includes smoothing means for enhancing the accuracy of determinations based upon said timing differences by combining timing difference values representing successive cycles of transmitting of a said first signal by said transmitting means and receiving of a said response signal by the same one of said receiving means.

21. A system, for determining geometric height in cooperation with an airborne transponder providing response signals which are subject to signal turnaround delay, comprising:

one or more transmitting means for transmitting first signals to said airborne transponder;

a plurality of receiving means positioned at spaced positions, for receiving response signals, which are subject to a signal turnaround delay between reception of a first signal and transmission of a response signal, from said airborne transponder in response to said first signals; and signal processing means, coupled to said transmitting means and responsive to timing differences between said transmitting of said first signals and said receiving of said response signals, said signal processing means utilizing data regarding said spaced positions to adjust said timing differences to compensate for said signal turnaround delay to provide adjusted timing differences and utilizing said adjusted timing differences to determine geometric height of said airborne transponder.

22. A system as in claim 21, for use with an airborne transponder providing response signals which include barometric altitude data, additionally comprising:

comparison means, coupled to said signal processing means, for comparing said geometric height as determined by said signal processing means with said barometric altitude data included in said response signals from said airborne transponder to derive barometric altitude deviation data representative of current atmospheric conditions in the vicinity of said airborne transponder; and means, coupled to said comparison means, for transmitting said geometric height to an aircraft in which said airborne transponder is located;

whereby, said barometric altitude deviation data is usable for calibrating a barometric altimeter.

23. A system, for deriving an approximate value of signal turnaround delay between reception of an interrogation signal by an airborne transponder and transmission of a response signal by said airborne transponder, comprising:

one or more transmitting means for transmitting interrogation signals to an airborne transponder;

a plurality of receiving means, positioned at spaced positions, for receiving response signals, which are subject to said turnaround delay, from said airborne transponder in response to said interrogation signals; and signal processing means, coupled to said receiving means and responsive to timing differences between said transmitting of said interrogation signals and said receiving of said response signals, said signal processing means utilizing data on said spaced positions to determine an approximate value of said turnaround delay between reception of an interrogation signal by said airborne transponder and transmission of a response signal by said airborne transponder in response to said interrogation signal;

whereby, said approximate value of said turnaround delay is usable for calibration of transmission and reception timing characteristics of said airborne transponder.

24. A system as in claim 23, additionally comprising means, coupled to said signal processing means, for transmitting said approximate value of said turnaround delay to an aircraft in which said airborne transponder is located, whereby said approximate value of said turnaround delay is usable for encoding into subsequent response signals to provide increased accuracy in use of said response signals for timing purposes.

25. A method, for deriving atmospheric deviation data for a location in the atmosphere, in cooperation with an airborne transponder providing response signals including current data based upon barometric pressure, comprising the steps of:

(a) transmitting first signals to said airborne transponder;

(b) receiving, at a plurality of spaced positions, response signals transmitted by said airborne transponder from an atmospheric location in response to said first signals, said response signals including data based upon barometric pressure in the vicinity of said atmospheric location;

(c) utilizing timing differences between said transmitting of said first signals in step (a) and said receiving of said response signals in step (b), with geometric data regarding said spaced positions, for deriving data representative of geometric height of said geometric location;

(d) comparing said geometric height data as derived in step (c) with said data based upon barometric pressure as received in step (b) from said airborne transponder; and (e) utilizing the results of said step (d) comparison to derive atmospheric deviation data representative of deviation between said data based upon barometric pressure and atmospheric reference data applicable to said atmospheric location.

26. A method as in claim 25, additionally comprising the step of:

(f) developing atmospheric profile data using atmospheric deviation data derived in step (e) based upon response signals received from one or more airborne transponders positioned at a plurality of heights.

27. A method as in claim 25, additionally comprising the step of:

(f) transmitting said atmospheric deviation data to an aircraft for use in calibration of a barometric altimeter.

28. A method as in claim 25, additionally comprising the following steps between steps (b) and (c):

(i) utilizing timing differences between said transmitting of said first signals in step (a) and said receiving of said response signals in step (b), with geometric data regarding said spaced positions, for deriving an approximate value of a signal turnaround delay between the receiving of first signals and transmission of response signals by said airborne transponder;

(ii) applying said approximate value of said signal turnaround delay to adjust said timing differences to provide adjusted timing differences; and (iii) supplying said adjusted timing differences for use in step (c) in substitution for said timing differences recited therein.

29. A method as in claim 25, wherein said data based upon barometric pressure as received in step (b) comprises barometric altimeter data and step (e) comprises utilizing the results of said step (d) comparison to derive atmospheric deviation data representative of deviation between barometric altimeter readings and geometric height in the vicinity of said atmospheric location at or about the time of said receiving of response signals from said airborne transponder.

30. A method as in claim 25, wherein said data based upon barometric pressure as received in step (b) comprises barometric altimeter data and step (e) comprises utilizing the results of said step (d) comparison to derive atmospheric deviation data representative of deviation between barometric pressure in the vicinity of said atmospheric location and reference atmospheric pressure for a height similar to said geometric height of said atmospheric location.

31. A method as in claim 25, wherein step (e) includes utilizing the results of said step (d) comparison together with atmospheric pressure/altitude reference profile data, to derive atmospheric deviation data representative of deviation between measured barometric pressure in the vicinity of said atmospheric location and relevant atmospheric reference pressure data from said atmospheric pressure/altitude profile data.

32. A method, for deriving atmospheric deviation data for a location in the atmosphere, comprising the steps of:

(a) receiving input data including data based upon barometric pressure measured in the vicinity of an atmospheric location and range data representative of approximate distances to said atmospheric location from a plurality of reference points at spaced positions, and which may include azimuth data representative of approximate azimuths of said atmospheric location relative to said reference points;

(b) utilizing said range data and/or said azimuth data, together with geometric data regarding said spaced positions of said reference points, for deriving data representative of the geometric height of said atmospheric location above a datum level;

(c) comparing said geometric height data as derived in step (b) with said data based upon barometric pressure as received in step (a); and (d) utilizing the results of said step (c) comparison to derive atmospheric deviation data representative of deviation between said data based upon barometric pressure and atmospheric reference data applicable to said atmospheric location.

33. A method as in claim 32, additionally comprising the step of:

(e) developing atmospheric profile data using atmospheric deviation data derived in step (d) based upon input data received in step (a) with respect to a plurality of atmospheric locations at a plurality of heights and/or geographic positions.

34. A method for inflight calibration of a barometric altimeter located in an aircraft, comprising the steps of:

(a) transmitting first signals to an airborne transponder located in said aircraft;

(b) receiving, at a plurality of spaced positions, response signals transmitted by said airborne transponder in response to said first signals;

(c) utilizing timing differences between said transmitting of said first signals and said receiving of said response signals and geometric data regarding said spaced positions for determining geometric height of said airborne transponder;

(d) transmitting data representative of said geometric height to said aircraft; and (e) utilizing said data to adjust the calibration of said barometric altimeter as necessary to achieve desired consistency between said geometric height and altitude measurements provided by said barometric altimeter.

* * * * *